United States Patent
Creeden et al.

(10) Patent No.: US 7,953,128 B2
(45) Date of Patent: May 31, 2011

(54) PUMP RECYCLING SCHEME FOR TERAHERTZ GENERATION

(75) Inventors: Daniel Creeden, Nashua, NH (US); Peter A. Ketteridge, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 792 days.

(21) Appl. No.: 12/011,876

(22) Filed: Jan. 30, 2008

(65) Prior Publication Data

US 2011/0075690 A1    Mar. 31, 2011

(51) Int. Cl.
*H01S 3/10* (2006.01)

(52) U.S. Cl. ............................. 372/21; 372/22

(58) Field of Classification Search ............ 372/21, 372/22, 23
See application file for complete search history.

(56) References Cited

U.S. PATENT DOCUMENTS

| | | | |
|---|---|---|---|
| 6,016,214 A | 1/2000 | Meyer, Jr. et al. | |
| 6,101,023 A | 8/2000 | Meyer, Jr. et al. | |
| 6,144,679 A | 11/2000 | Herman et al. | |
| 6,215,800 B1 | 4/2001 | Kumine | |
| 7,272,158 B1 | 9/2007 | Hayes et al. | |
| 2005/0242287 A1 | 11/2005 | Hakimi | |
| 2006/0146893 A1 | 7/2006 | Belyanin et al. | |

OTHER PUBLICATIONS

Hu, et al.; Terahertz Quantum Cascade Lasers, Electronics, and Real-time Imaging; http://www.rle.mit.edu/media/pr148/27.pdf; pp. 27-1 thru 27-224, 2005.
Mueller, Eric R.; Terahertz Radiation Sources for Imaging and Sensing Applications; http://www.coherent.com/Downloads/1106_PS%20Coherent%20Reprint.pdf; 6 pages, 2006.
Optical Parametric Oscillator; http://en.wikipedia.org/wiki/Optical_parametric_oscillator; 3 pages, 2008.
G.A. Blake Group; Coherent Light Sources & Spectrometers; http://www.gps.caltech.edu/~gab/spectrometers/spectrometers.html; 8 pages, 2008.

*Primary Examiner* — Armando Rodriguez
(74) *Attorney, Agent, or Firm* — Daniel J. Long

(57) ABSTRACT

Structures and techniques are disclosed that enable efficient generation of terahertz (THz) radiation capable of surpassing the fundamental quantum limit, as defined by the Manley-Rowe relations. In one particular embodiment, a difference frequency mixing (DFM) crystal stage receives pump radiation and signal radiation, and generates THz radiation. Leftover signal radiation from the DFM stage is then used to pump an optical parametric oscillator (OPO) stage, which is used to generate another mixing signal and more THz radiation. The output signal and the residual pump from the OPO stage can then be used in a subsequent DFM process to generate even more terahertz radiation, and further drives a subsequent OPO stage. Such cascaded OPO, DFM, OPO staging can be repeated to maximize total amount of THz output power.

21 Claims, 3 Drawing Sheets

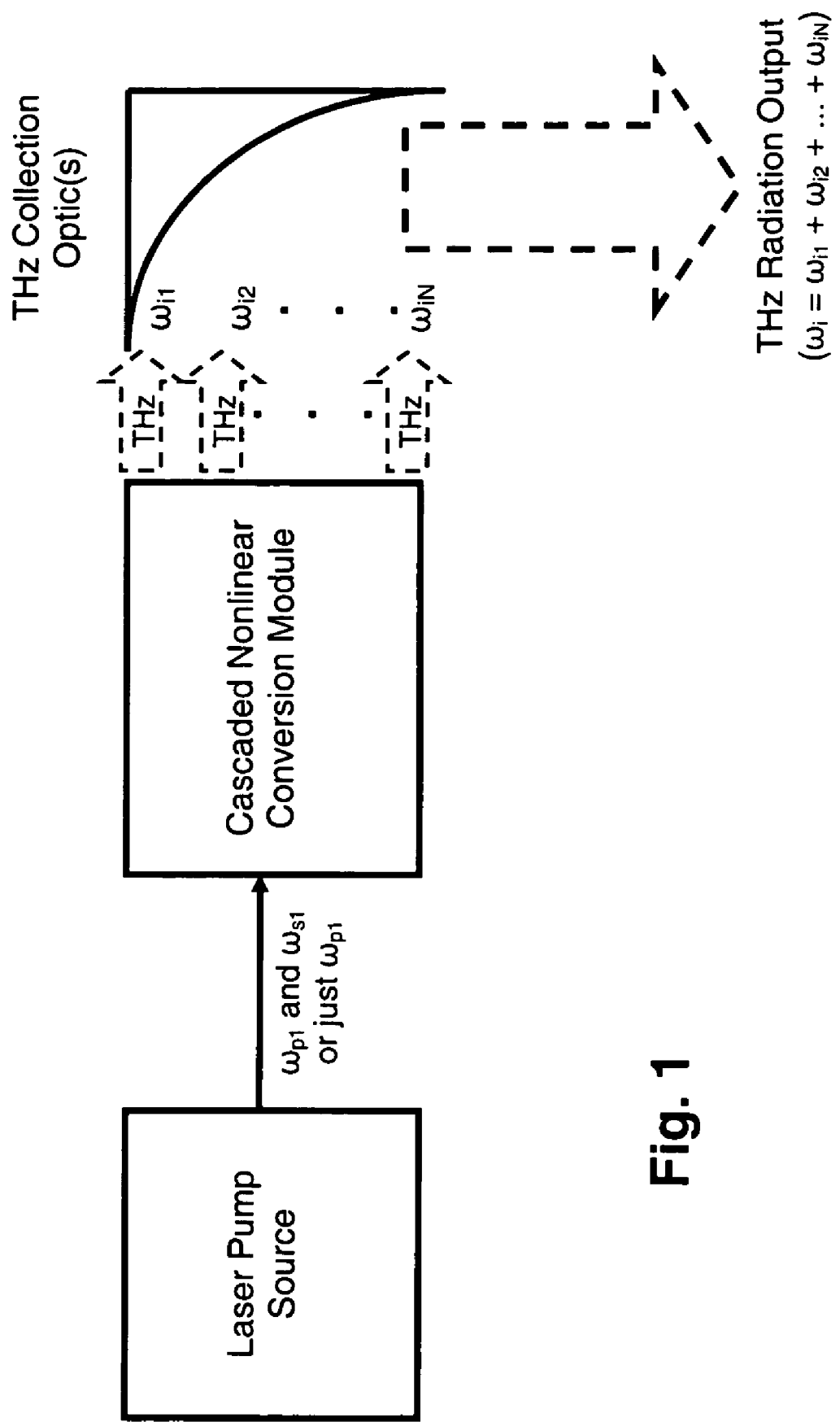

PUMP RECYCLING SCHEME FOR TERAHERTZ GENERATION

FIELD OF THE INVENTION

The invention relates to lasers, and more particularly, to terahertz radiation (THz) generation techniques.

BACKGROUND OF THE INVENTION

Radiation in the terahertz (THz) frequency range has certain properties that make it useful in applications such as spectroscopy, medical and security imaging, process monitoring and inspection in manufacturing, and remote sensing. This is because THz radiation can safely pass through living organisms and materials such as clothing fabrics, plastics, paper materials, masonry, and ceramics. In short, the THz radiation interacts with such materials causing certain information signals to be generated, which in turn can be used to form multi-dimensional images of the materials. In addition, measuring absorption of THz radiation as a function of wavelength allows for spectroscopic imaging and chemical composition detection.

However, there are problems associated with THz radiation generation. For instance, because of frequency conversion techniques, the Manley-Rowe conditions limit conversion efficiency: As a result, conventional THz generation techniques limit terahertz conversion efficiency and output power achievable. What is needed, therefore, are techniques for efficient THz radiation generation.

SUMMARY OF THE INVENTION

One embodiment of the present invention provides a terahertz signal generation system. The system includes a first nonlinear difference frequency mixing (DFM) crystal stage for receiving pump radiation $\omega_{p1}$ and signal radiation $\omega_{s1}$, and mixing $\omega_{p1}$ and $\omega_{s1}$ to generate terahertz radiation $\omega_{i1}$. The system further includes a first optical parametric oscillator (OPO) crystal stage for receiving $\omega_{s1}$ as its pump radiation $\omega_{p2}$, and generating signal radiation $\omega_{s2}$ and terahertz radiation having a frequency substantially equal to $\omega_{i1}$. The system further includes a second nonlinear DFM crystal stage for receiving pump radiation $\omega_{p2}$ and signal radiation $\omega_{s2}$, and mixing $\omega_{p2}$ and $\omega_{s2}$ to generate terahertz radiation $\omega_{i2}$. The system further includes a second OPO crystal stage for receiving $\omega_{s2}$ as its pump radiation $\omega_{p3}$, and generating signal radiation $\omega_{s3}$ and terahertz radiation having a frequency substantially equal to $\omega_{i2}$. Note that $\omega_{i1}$ can be substantially equal to $\omega_{i2}$, but need not be. The system may further include additional DFM and OPO crystal stages to provide additional terahertz radiation, thereby providing desired quantum conversion efficiency (which may exceed Manley-Rowe relations). The DFM and OPO crystal stages may be, for example, in a single crystal. Alternatively, the DFM and OPO crystal stages may comprise a linear array of different nonlinear crystals. The DFM and OPO crystal stages can be implemented, for instance, with an orientation patterned gallium arsenide (OP-GaAs), periodically-poled lithium niobate (PPLN), zinc germanium phosphide (ZGP), gallium selenide (GaSe), or combinations thereof. The system may also include a first thin film polarizer on the output of the first DFM crystal stage for passing residual pump radiation $\omega_{p1\_res}$ and reflecting $\omega_{s1}$ for use as input at the first OPO crystal stage, and a second thin film polarizer on the output of the second DFM crystal stage for passing residual pump radiation $\omega_{p2\_res}$ and reflecting $\omega_{s2}$ for use as input at the second OPO crystal stage. The system may also include a number of mirrors, each for reflecting radiation output by one crystal stage for use as input at a subsequent crystal stage, as well as a number of lenses, each for focusing radiation into a corresponding one of the DFM and OPO crystal stages. The system may also include a volume Bragg grating (VBG) after each OPO crystal stage for providing a partial reflector for signal radiation in that stage, as well as a highly reflective VBG before each OPO crystal stage for providing a highly reflective surface for signal radiation in that stage. The OPO crystal stages can be singly-resonant. In one particular case, the wavelengths of the pump radiation and signal radiation within any of the DFM crystal stages are within 10 nanometers of each other. The $\omega_{p1}$ and $\omega_{s1}$ can be provided by a dual-wavelength laser pump source, or alternatively, by an initial OPO crystal stage operatively coupled to a single wavelength laser pump source capable of providing $\omega_{p1}$. The system may also include terahertz collection optics for collecting generated terahertz radiation.

Another embodiment of the present invention provides a terahertz signal generation system. Here, the system includes a laser pump source for providing signal radiation $\omega_{s1}$ and pump radiation $\omega_{p1}$. The system further includes a first nonlinear difference frequency mixing (DFM) crystal stage for receiving $\omega_{p1}$ and $\omega_{s1}$, and mixing $\omega_{p1}$ and $\omega_{s1}$ to generate terahertz radiation $\omega_{i1}$. The system further includes a first optical parametric oscillator (OPO) crystal stage for receiving $\omega_{s1}$ as its pump radiation $\omega_{p2}$, and generating signal radiation $\omega_{s2}$ and terahertz radiation having a frequency substantially equal to $\omega_{i1}$. The system further includes a second nonlinear DFM crystal stage for receiving pump radiation $\omega_{p2}$ and signal radiation $\omega_{s2}$, and mixing $\omega_{p2}$ and $\omega_{s2}$ to generate terahertz radiation $\omega_{i2}$. The system further includes a second OPO crystal stage for receiving $\omega_{s2}$ as its pump radiation $\omega_{p3}$, and generating signal radiation $\omega_{s3}$ and terahertz radiation having a frequency substantially equal to $\omega_{i2}$. The system further includes terahertz collection optics for collecting generated terahertz radiation.

Another embodiment of the present invention provides a terahertz signal generation system. In this example case, the system includes a laser pump source for providing pump radiation $\omega_{p1}$. The system further includes a first optical parametric oscillator (OPO) crystal stage for pump radiation $\omega_{p1}$, and generating signal radiation $\omega_{s1}$ and terahertz radiation $\omega_{i1}$. The system further includes a first nonlinear difference frequency mixing (DFM) crystal stage for receiving $\omega_{p1}$ and $\omega_{s1}$ output by the first OPO crystal stage, and mixing $\omega_{p1}$ and $\omega_{s1}$ to generate terahertz radiation having a frequency substantially equal to $\omega_{i1}$. The system further includes a second OPO crystal stage for receiving $\omega_{s1}$ as its pump radiation $\omega_{p2}$, and generating signal radiation $\omega_{s2}$ and terahertz radiation $\omega_{i2}$. The system further includes a second nonlinear DFM crystal stage for receiving pump radiation $\omega_{p2}$ and signal radiation $\omega_{s2}$, and mixing $\omega_{p2}$ and $\omega_{s2}$ to generate terahertz radiation having a frequency substantially equal to $\omega_{i2}$. The system further includes terahertz collection optics for collecting the generated terahertz radiation.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1 illustrates a system for generating THz radiation, configured in accordance with one embodiment of the present invention.

DETAILED DESCRIPTION OF THE INVENTION

Figure 2A:
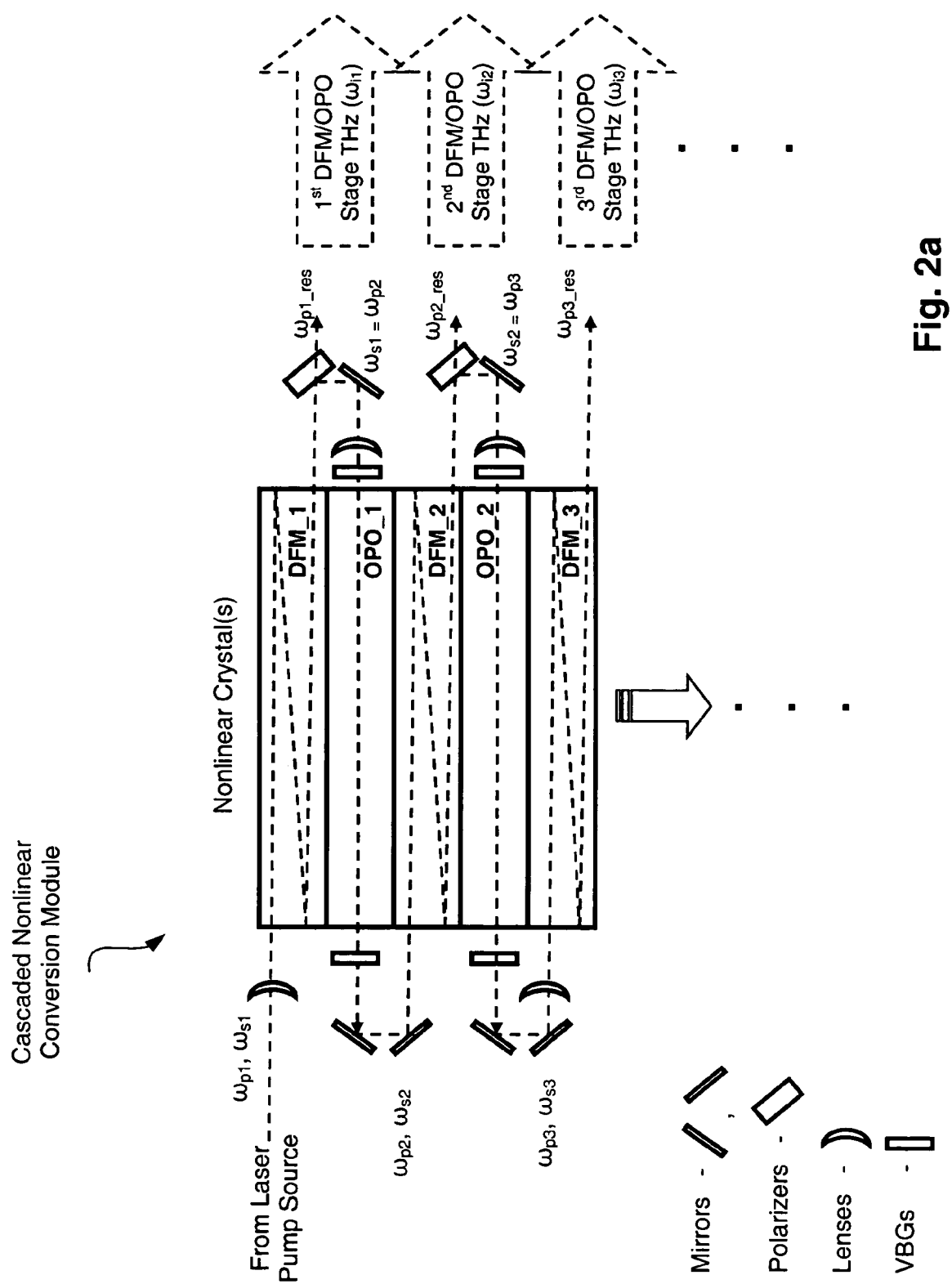
FIG. 2a illustrates a cascaded nonlinear conversion module of FIG. 1, configured in accordance with one embodiment of the present invention.

Structures and techniques are disclosed that enable efficient generation of terahertz (THz) radiation surpassing the fundamental quantum limit, as defined by the Manley-Rowe relations. These structures and techniques can be employed, for example, to provide a highly efficient terahertz laser source with overall conversion efficiency higher than the quantum limit, in applications such as security screening, airport imaging, and port security. Other applications, such as medical imaging, quality control and process monitoring in manufacturing operations, and package and container inspection will be apparent in light of this disclosure.

General Overview

Conventional difference frequency mixing (DFM) processes cannot exceed the fundamental upper limit, as defined by the Manley-Rowe relations, which states that the number of THz photons which are created in a nonlinear process cannot exceed the number of pump photons present at the input. In theory, 100% quantum conversion efficiency for DFM is the upper limit. This is not achievable using conventional technology. However, and in accordance with an embodiment of the present invention, a pump recycling scheme can be used to achieve this goal or improve conversion efficiency, relative to conventional techniques.

In DFM, two beams are mixed to generate THz photons. One pump beam, with frequency $\omega_p$, is depleted and transfers energy to the other pump beam, with frequency $\omega_s$, amplifying that signal. Each time a pump photon with frequency $\omega_p$ is destroyed, a signal photon and an idler photon, with frequencies $\omega_s$ and $\omega_i$ respectively, are created to conserve energy. In a traditional DFM process, the idler frequency $\omega_i$ is the signal of interest, so after a single mixing stage, the amplified signal radiation with frequency $\omega_s$ is discarded. Because a single nonlinear DFM process cannot exceed the quantum limit, the efficiency is low and cannot exceed $\omega_i/\omega_p$. To overcome this limit, and in accordance with an embodiment, the leftover signal $\omega_s$ can be recycled to drive additional nonlinear processes.

In one particular embodiment, for instance, the leftover signal $\omega_s$ is used to pump an optical parametric oscillator (OPO) stage, which is used to generate another mixing signal and more THz radiation. The output signal ($\omega_{s2}$) and the residual pump ($\omega_{p2}$) from the OPO can then be used in a subsequent DFM process (or multiple DFM processes) to generate even more terahertz radiation. Such cascaded OPO, DFM, OPO staging can then be repeated to maximize the total amount of THz output power. Although each nonlinear stage will not individually exceed the quantum limit, the total number of idler THz photons ($\omega_i$) created can exceed that defined by the Manley-Rowe relations. As will be apparent in light of this disclosure, these staged processes can be performed in several different nonlinear crystals, or in a single nonlinear crystal.

System Architecture

FIG. 1 illustrates a system for generating THz radiation, configured in accordance with one embodiment of the present invention. As can be seen, the system includes a laser pump source, a cascaded nonlinear conversion module, and THz collection optics. In this example configuration, the cascaded nonlinear conversion module is external to a laser pump source. In other embodiments, however, the cascaded nonlinear conversion module may be internal to the pump source (e.g., coupled directly to the output of laser resonator cavity). Likewise, the entire system may be potted or otherwise assembled into a single discrete unit.

The laser pump source outputs the desired wavelength (or wavelengths) of light to create phase-matching in crystals of the cascaded nonlinear conversion module. In particular, the laser pump source is configured to generate wavelength $\omega_p$, or wavelengths $\omega_p$ and $\omega_s$, depending on the configuration of the cascaded nonlinear conversion module, as will be explained in turn. In any case, the light from the laser pump source is focused into the first nonlinear conversion stage of the cascaded nonlinear conversion module to begin the cascading nonlinear process. Essentially any wavelength of pump light may be used as long as it may phase-match in the nonlinear crystals of the cascaded nonlinear conversion module. For example, the laser may output 1-micron, 1.5-micron, 2-micron light, as they are easily generated. The laser pump source (which may include one or more laser sources) can be implemented, for instance, with a conventional laser source such as a diode-pumped solid-state laser, gas laser, or a fiber laser system. In one specific example case, an Ytterbium-doped fiber laser may be used to generate 1.055 micron light and 1.064 micron light (the difference frequency of which is 122 microns).

The cascaded nonlinear conversion module, which will be discussed in more detail with reference to FIGS. 2a and 2b, generates THz radiation ($\omega_{i1}$, $\omega_{i2}$, $\omega_{i3}$, etc) from the light provided by the laser pump source. The generated THz radiation ($\omega_{i1}$, $\omega_{i2}$, . . . $\omega_{iN}$) is collected by the THz collection optics, which can be, for example, a terahertz collection mirror or other suitable THz collection optic or optics assembly. As will be apparent, N is the number of DFM/OPO stages. The THz collection optics can generally be configured based on parameters associated with the output of the cascaded nonlinear conversion module, such as size and shape of output field (which depends on the number of DFM/OPO stages) as well as the intensity of the output. The THz collection optics direct the collected THz radiation $\omega_i$ to the intended application. As previously explained, numerous applications can employ an embodiment of the present invention, including examples such as homeland security screening, airport imaging, port security, medical imaging, quality control and process monitoring in manufacturing operations, or package and container inspection).

The THz radiation ($\omega_{i1}$, $\omega_{i2}$, $\omega_{i3}$, etc) generated in each nonlinear step of the cascaded nonlinear conversion module may be at the same wavelength. Alternatively, each nonlinear step of the cascaded nonlinear conversion module can be designed to emit a different terahertz wavelength. Such will depend on factors such as phase-matching conditions of the crystals chosen (in the cascaded nonlinear conversion module) and the pump wavelengths used (from the laser pump source). If each stage of the cascaded nonlinear conversion module is designed to give the same energy difference between the mixing pumps $\omega_p$ and signals $\omega_s$, then the same wavelength of terahertz radiation will be generated in each stage (e.g., where high power $\omega_i$ is required). If the energy differences between the mixing pumps $\omega_p$ and signals $\omega_s$ are different in each stage of the cascaded nonlinear conversion module, then each nonlinear conversion step will produce a different terahertz wavelength (e.g., where a wide spectrum of $\omega_i$ is required). As will be appreciated, whether the THz radiation output $\omega_i$ is high power or broad spectrum depends on the given application.

Cascaded Nonlinear Conversion Module

Figure 2B:
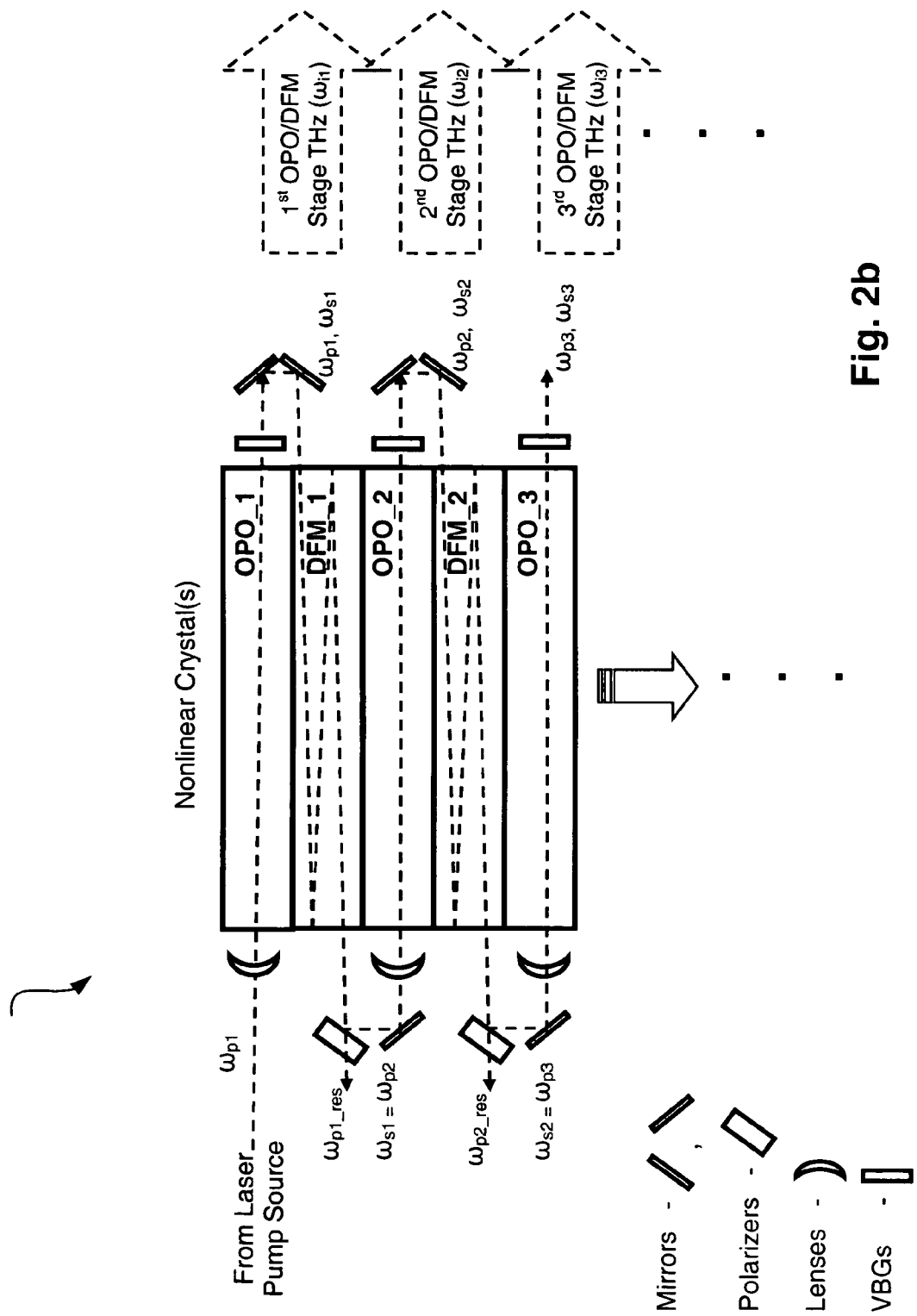
FIG. 2b illustrates a cascaded nonlinear conversion module of FIG. 1, configured in accordance with another embodiment of the present invention.

FIG. 2a illustrates a cascaded nonlinear conversion module of FIG. 1, configured in accordance with one embodiment of the present invention. This module is configured for implementing a pump recycling scheme for THz generation with a dual-wavelength pump source.

In particular, and as can be seen, a laser pump source generates two wavelengths, $\omega_{p1}$, $\omega_{s1}$, whose difference frequency is the THz signal of interest. These signals are passed into a nonlinear DFM crystal stage (DFM_1). The signals $\omega_{p1}$ and $\omega_{s1}$ are mixed in the crystal, generating THz photons $\omega_i$ and depleting the pump beam with the highest frequency ($\omega_{p1}$). After several passes within DFM_1 (three passes shown), the pump $\omega_{p1}$ is depleted (any residual pump $\omega_{p1\_res}$ is negligible), and the amplified signal $\omega_{s1}$ is optically directed for use in pumping an OPO crystal stage (OPO_1). As is generally known, an OPO provides a nonlinear optical interaction that converts an input laser wave ($\omega_p$, generally referred to as pump) into two output waves of lower frequency ($\omega_s$ and $\omega_i$, referred to as signal and idler, respectively). The sum of the output wave frequencies is equal to the input wave frequency (i.e., $\omega_s+\omega_i=\omega_p$). In the example shown in FIG. 2a, the signal $\omega_{s1}$ output by DFM_1 is the pump $\omega_{p2}$ of the OPO_1. Note that DFM_1 and OPO_1 generally make up the first THz generation stage of the cascaded nonlinear conversion module, with DFM_2 and OPO_2 making up the second THz generation stage, and etc.

In this first OPO stage, another signal ($\omega_{s2}$) is generated such that the difference frequency between that signal $\omega_{s2}$ and the pump $\omega_{p2}$ (which equals $\omega_{s1}$) has the same terahertz frequency as the previous stage output (i.e., $\omega_{i1}$). The two wavelengths produced by OPO_1, $\omega_{s2}$ and $\omega_{p2}$ (e.g., IR signals), are then difference frequency mixed in a second DFM crystal stage (DFM_2) to generate additional THz radiation ($\omega_{i2}$). After several passes within DFM_2, a second OPO stage (OPO_2) is run with the residual amplified signal light $\omega_{s2}$ (which is $\omega_{p3}$) to generate $\omega_{s3}$, followed by another DFM process (DFM_3) which generates additional THz radiation ($\omega_{i3}$), based on the difference between $\omega_{s3}$ and $\omega_{p3}$. This cascading of paired DFM and OPO stages as shown can be repeated a number of times (e.g., 2 to 20 times) and allows the total number of generated THz photons $\omega_i$ to exceed the original limit defined by the Manley-Rowe relations (which is equal to the total number of photons with frequency $\omega_p$). This is achieved, in part, by recycling one of the original pumps $\omega_{s1}$ generated by the laser pump source which is not depleted in the first DFM process.

The nonlinear crystal material of the cascaded nonlinear conversion module may be a single crystal, or may consist of a linear array of different nonlinear crystals. In one example embodiment, orientation patterned gallium arsenide (OP-GaAs) is used for performing all DFM and OPO processes in the same crystal. Other suitable crystal such as periodically-poled lithium niobate (PPLN), zinc germanium phosphide (ZGP) and gallium selenide (GaSe) may also be used. Alternatively, each subsequent DFM or OPO process can be performed in separate crystals (e.g., ZGP, OP-GaAs, PPLN, or GaSe crystals, or combinations thereof). Note, however, that such a multi-crystal configuration increases system complexity (e.g., inter-crystal interface and optical coupling).

Also shown in the example embodiment of FIG. 2a are various optics including mirrors, polarizers, lenses, and gratings, as will now be discussed. As can be seen, the narrow slanted rectangles are mirrors where the pump $\omega_p$ and signal $\omega_s$ radiation are reflected. The wider slanted rectangle after each DFM process represents a thin film polarizer which passes the residual pump radiation $\omega_{p\_res}$ and reflects the amplified signal radiation $\omega_s$. The crescent moons are lenses to focus the light into the respective DFM and OPO stages. The vertical rectangles of each OPO stage is a volume Bragg grating (VBG) that acts as a partial reflector for the signal wavelength $\omega_s$ only in the OPO cavity. Assuming the pump $\omega_p$ and signal $\omega_s$ radiation is in the infrared (IR) spectrum, the mirrors, polarizers, lenses, and gratings can be implemented using IR optics. In one example embodiment, the pump $\omega_p$ and signal $\omega_s$ wavelengths are close together (on the order of a few nanometers apart, such as where $\omega_p$=1.059 μm and $\omega_s$=1.064 μm). As such, thin film optical coatings cannot be used, as they are not selective enough to reflect the OPO signal light $\omega_s$ while not reflecting the pump light $\omega_p$. There is also a highly reflective VBG before each OPO stage (proximate each crescent moon lens) to act as a highly reflective surface for the signal in the OPO. The wavelengths for each VBG can be different for each OPO stage and depend on the nonlinear crystal being used and the wavelength of THz radiation being generated. The IR optics are transparent to THz radiation. In addition, reflective coatings that are transparent to IR radiation can be used to constrain the THz output to a particular output of the cascaded nonlinear conversion module, such as the side output as shown in FIG. 2a.

A number of non-trivial nuances associated with generating terahertz radiation will now be discussed. In general, pump recycling using OPO/OPA or OPO/DFM for mid-IR light is known. However, pump recycling for terahertz generation is not. One fundamental difference is that, in embodiments for generating terahertz radiation as described herein, the pump and signal beams are very close together. For example, to generate terahertz radiation, the pump $\omega_p$ may have a wavelength of 1059 nm and the signal $\omega_s$ may have a wavelength of 1064 nm, generating a terahertz wavelength of 225-microns. Because the wavelengths are so close together, conventional thin-film coatings that are typically used cannot be used in the OPO cavities/stages of a terahertz generation system. Thus, gratings such as the VBG are used in accordance with embodiments of the present invention (other comparably selective optics may be used in place of gratings if available and so desired). Also, the OPO cavities are singly-resonant in accordance with some embodiments, to avoid the need for terahertz optics. Terahertz generation is essentially a by-product of the nonlinear processes occurring between the pump $\omega_p$ and signal $\omega_s$ beams. The terahertz signal $\omega_i$ is generated as energy and momentum are conserved in the nonlinear interaction.

One conventional technique for THz generation uses optical rectification and waveguides. Such techniques are fundamentally different from embodiments of the present invention, which utilize difference frequency mixing and optical parametric oscillation to recycle the photons and improve efficiency. For instance, one such conventional optical rectification and waveguide system employs a Raman cascading scheme, which is a completely distinct process from DFM. In addition, that particular technique uses waveguide dispersion to engineer an efficient process. In contrast, embodiments of the present invention employ DFM and OPO processes in a cascaded scheme to recycle the photons and improve overall efficiency. Some such embodiments use nanosecond pulses (e.g., 1 to 100 nanometers, such as where the DFM pump radiation wavelength is within 10 nanometers of the DFM signal radiation wavelength). The use of the longer pulses in accordance with such embodiments of the present invention yields a narrow THz signal spectrum. No waveguides are required to engineer the material dispersion; rather, the nonlinear crystals themselves provide the proper phase-matching conditions for THz generation.

As an alternative configuration to beginning with a dual-wavelength pump source and DFM process, a single laser may be used to generate only a single pump $\omega_p$ wavelength. A schematic of such an alternative pump recycling scheme for THz generation is shown in FIG. 2b. In this case, the first nonlinear conversion stage is an OPO stage (OPO_1) in which a signal $\omega_{s1}$ and a THz idler $\omega_{i1}$ are created. As previously explained, optical parametric processes use non-linear crystals to split a single $\omega_{p1}$ photon into two longer wavelength photons, called the signal and idler waves ($\omega_{s1}$ and $\omega_{i1}$, respectively). The signal wave $\omega_{s1}$ has the shorter wavelength, while the idler wave $\omega_{i1}$ has the longer wavelength.

The next stage is a multi-pass DFM (DFM_1), which acts as a THz converter and signal amplifier (where $\omega_{p1}$ is depleted to $\omega_{p1\_res}$). The amplified signal $\omega_{s1}$ is then used as a pump source (i.e., $\omega_{s1}=\omega_{p2}$) for a second OPO stage (OPO_2), which generates another mixing signal $\omega_{s2}$ as well as THz radiation $\omega_{i2}$. The pump $\omega_{p2}$ and new signal $\omega_{s2}$ are then difference frequency mixed in a second DFM stage (DFM_2), where the pump $\omega_{p2}$ is again depleted ($\omega_{p2\_res}$), the signal $\omega_{s2}$ is amplified, and THz photons $\omega_{i3}$ are created. This cascading of nonlinear OPO/DFM processes can be continued until the desired conversion efficiency is achieved (e.g., 2 to 20 times), and allows for the quantum limit to be exceeded.

Such architectures take advantage of the laser pump source. Each single pass element in such a system will not exceed the quantum limit defined by that interaction, but by cascading several nonlinear processes, the total THz conversion can exceed the initial limit (defined by $\omega_i/\omega_{p1}$). This is due to the fact that the residual photons created in the nonlinear processes are recycled and used to then drive subsequent nonlinear processes with an overall photon conversion efficiency that is greater than quantum limit. The overall quantum conversion efficiency of the system will be a function of the quantum efficiency of each DFM and each OPO stage as well as the total number of cascaded nonlinear processes. This cascaded architecture may be repeated as necessary to improve conversion efficiency.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A terahertz signal generation system, comprising:
   a first nonlinear difference frequency mixing (DFM) crystal stage for receiving pump radiation $\omega_{p1}$ and signal radiation $\omega_{s1}$, and mixing $\omega_{p1}$ and $\omega_{s1}$ to generate terahertz radiation $\omega_{i1}$;
   a first optical parametric oscillator (OPO) crystal stage for receiving $\omega_{s1}$ as its pump radiation $\omega_{p2}$, and generating signal radiation $\omega_{s2}$ and terahertz radiation having a frequency substantially equal to $\omega_{i1}$;
   a second nonlinear DFM crystal stage for receiving pump radiation $\omega_{p2}$ and signal radiation $\omega_{s2}$, and mixing $\omega_{p2}$ and $\omega_{s2}$ to generate terahertz radiation $\omega_{i2}$; and
   a second OPO crystal stage for receiving $\omega_{s2}$ as its pump radiation $\omega_{p3}$, and generating signal radiation $\omega_{s3}$ and terahertz radiation having a frequency substantially equal to $\omega_{i2}$.

2. The system of claim 1, further comprising:
   additional DFM and OPO crystal stages to provide additional terahertz radiation, thereby providing desired quantum conversion efficiency.

3. The system of claim 2 wherein the desired quantum conversion efficiency exceeds Manley-Rowe relations.

4. The system of claim 1 wherein the DFM and OPO crystal stages are in a single crystal.

5. The system of claim 1 wherein the DFM and OPO crystal stages comprise a linear array of different nonlinear crystals.

6. The system of claim 1 wherein the DFM and OPO crystal stages are implemented with an orientation patterned gallium arsenide (OP-GaAs), periodically-poled lithium niobate (PPLN), zinc germanium phosphide (ZGP), gallium selenide (GaSe), or combinations thereof.

7. The system of claim 1 further comprising
   a first thin film polarizer on the output of the first DFM crystal stage for passing residual pump radiation $\omega_{p1\_res}$ and reflecting $\omega_{s1}$ for use as input at the first OPO crystal stage; and
   a second thin film polarizer on the output of the second DFM crystal stage for passing residual pump radiation $\omega_{p2\_res}$ and reflecting $\omega_{s2}$ for use as input at the second OPO crystal stage.

8. The system of claim 1 further comprising:
   a number of mirrors, each for reflecting radiation output by one crystal stage for use as input at a subsequent crystal stage; and
   a number of lenses, each for focusing radiation into a corresponding one of the DFM and OPO crystal stages.

9. The system of claim 1 further comprising:
   a volume Bragg grating (VBG) after each OPO crystal stage for providing a partial reflector for signal radiation in that stage; and
   a highly reflective VBG before each OPO crystal stage for providing a highly reflective surface for signal radiation in that stage.

10. The system of claim 1 wherein the OPO crystal stages are singly-resonant.

11. The system of claim 1 wherein wavelengths of the pump radiation and signal radiation within any of the DFM crystal stages are within 10 nanometers of each other.

12. The system of claim 1 wherein $\omega_{p1}$ and $\omega_{s1}$ are provided by one of a dual-wavelength laser pump source, or an initial OPO crystal stage operatively coupled to a single wavelength laser pump source capable of providing $\omega_{p1}$, and the system further comprises terahertz collection optics for collecting generated terahertz radiation.

13. The system of claim 1 wherein $\omega_{i1}$ is substantially equal to $\omega_{i2}$.

14. A terahertz signal generation system, comprising:
   a laser pump source for providing signal radiation $\omega_{s1}$ and pump radiation $\omega_{p1}$;
   a first nonlinear difference frequency mixing (DFM) crystal stage for receiving $\omega_{p1}$ and $\omega_{s1}$, and mixing $\omega_{p1}$ and $\omega_{s1}$ to generate terahertz radiation $\omega_{i1}$;
   a first optical parametric oscillator (OPO) crystal stage for receiving $\omega_{s1}$ as its pump radiation $\omega_{p2}$, and generating signal radiation $\omega_{s2}$ and terahertz radiation having a frequency substantially equal to $\omega_{i1}$;
   a second nonlinear DFM crystal stage for receiving pump radiation $\omega_{p2}$ and signal radiation $\omega_{s2}$, and mixing $\omega_{p2}$ and $\omega_{s2}$ to generate terahertz radiation $\omega_{i2}$; and a second OPO crystal stage for receiving $\omega_{s2}$ as its pump radiation $\omega_{p3}$, and generating signal radiation $\omega_{s3}$ and terahertz radiation having a frequency substantially equal to $\omega_{i2}$; and terahertz collection optics for collecting generated terahertz radiation.

15. The system of claim 14 wherein $\omega_{i1}$ is substantially equal to $\omega_{i2}$.

16. The system of claim 14 wherein wavelengths of the pump radiation and signal radiation within any of the DFM crystal stages are within 10 nanometers of each other.

17. The system of claim 14, further comprising:
additional DFM and OPO crystal stages to provide additional terahertz radiation, thereby providing desired quantum conversion efficiency, wherein the desired quantum conversion efficiency exceeds Manley-Rowe relations.

18. A terahertz signal generation system, comprising:
a laser pump source for providing pump radiation $\omega_{p1}$;
a first optical parametric oscillator (OPO) crystal stage for pump radiation $\omega_{p1}$, and generating signal radiation $\omega_{s1}$ and terahertz radiation $\omega_{i1}$;
a first nonlinear difference frequency mixing (DFM) crystal stage for receiving $\omega_{p1}$ and $\omega_{s1}$ output by the first OPO crystal stage, and mixing $\omega_{p1}$ and $\omega_{s1}$ to generate terahertz radiation having a frequency substantially equal to $\omega_{i1}$;
a second OPO crystal stage for receiving $\omega_{s1}$ as its pump radiation $\omega_{p2}$, and generating signal radiation $\omega_{s2}$ and terahertz radiation $\omega_{i2}$;
a second nonlinear DFM crystal stage for receiving pump radiation $\omega_{p2}$ and signal radiation $\omega_{s2}$, and mixing $\omega_{p2}$ and $\omega_{s2}$ to generate terahertz radiation having a frequency substantially equal to $\omega_{i2}$; and
terahertz collection optics for collecting the generated terahertz radiation.

19. The system of claim 18 wherein $\omega_{i1}$ is substantially equal to $\omega_{i2}$.

20. The system of claim 18 wherein wavelengths of the pump radiation and signal radiation within any of the DFM crystal stages are within 10 nanometers of each other.

21. The system of claim 18, further comprising:
additional DFM and OPO crystal stages to provide additional terahertz radiation, thereby providing desired quantum conversion efficiency, wherein the desired quantum conversion efficiency exceeds Manley-Rowe relations.

* * * * *